Dec. 5, 1939.  A. C. CATLAND  2,182,247
WELL BIT CONSTRUCTION
Filed Jan. 19, 1937  2 Sheets-Sheet 2

Inventor
ALFRED C. CATLAND
By
His Attorney

Patented Dec. 5, 1939

2,182,247

UNITED STATES PATENT OFFICE 2,182,247

WELL BIT CONSTRUCTION

Alfred C. Catland, Alhambra, Calif., assignor to Globe Oil Tools Company, Los Nietos, Calif., a corporation of California Application January 19, 1937, Serial No. 121,377

6 Claims. (Cl. 255—71)

This invention relates to well drilling tools and relates more particularly to the mountings for the roller cutters of rotary well drilling bits. A general object of this invention is to provide practical, effective and long wearing mountings or bearings for the roller cutters of a well drilling bit.

Another object of this invention is to provide antifriction ball bearing mountings for the roller cutters of a well bit embodying long wearing races or bushings on the cutter supporting pins.

Another object of this invention is to provide a ball bearing cutter mounting of the character mentioned in which the balls bear in large or extensive races in the bushings and, therefore, do not cause rapid wearing of the bushings. In certain prior cutter mountings the cutters were rotatably supported by series of balls having direct point or line contact with the supporting pin. In such constructions the intensity of the pressure of the balls on the pins was very great due to the extremely limited contact of the balls with the pins and this intensified or concentrated pressure, causing the balls to rapidly wear grooves in the pins. During the wearing-in of such grooves the case hardened surfaces of the pins were penetrated so that the balls had bearing in the soft material of the pins. After penetration of the hardened surfaces of the pins the wearing of the pins was very rapid. In the mounting provided by the present invention the balls bear in rather extensive races in the hardened bushings so that the thrusts and pressures are well distributed over the surfaces of the races and the wear is greatly reduced.

Another object of this invention is to provide roller cutter mountings in which the series of balls assume or transmit the end thrusts in both directions as well as the radial thrusts so that thrust washers, or the like, are not required.

Another object of this invention is to provide ball bearing cutter mountings of the character mentioned in which the cutter supporting pins are subjected to little or no wear and the wear receiving bushings are inexpensive and readily replaceable.

Another object of this invention is to provide a rotary rock bit embodying inexpensive and dependable means for associating or connecting the cutter mountings with the body of the bit.

Figure 1:
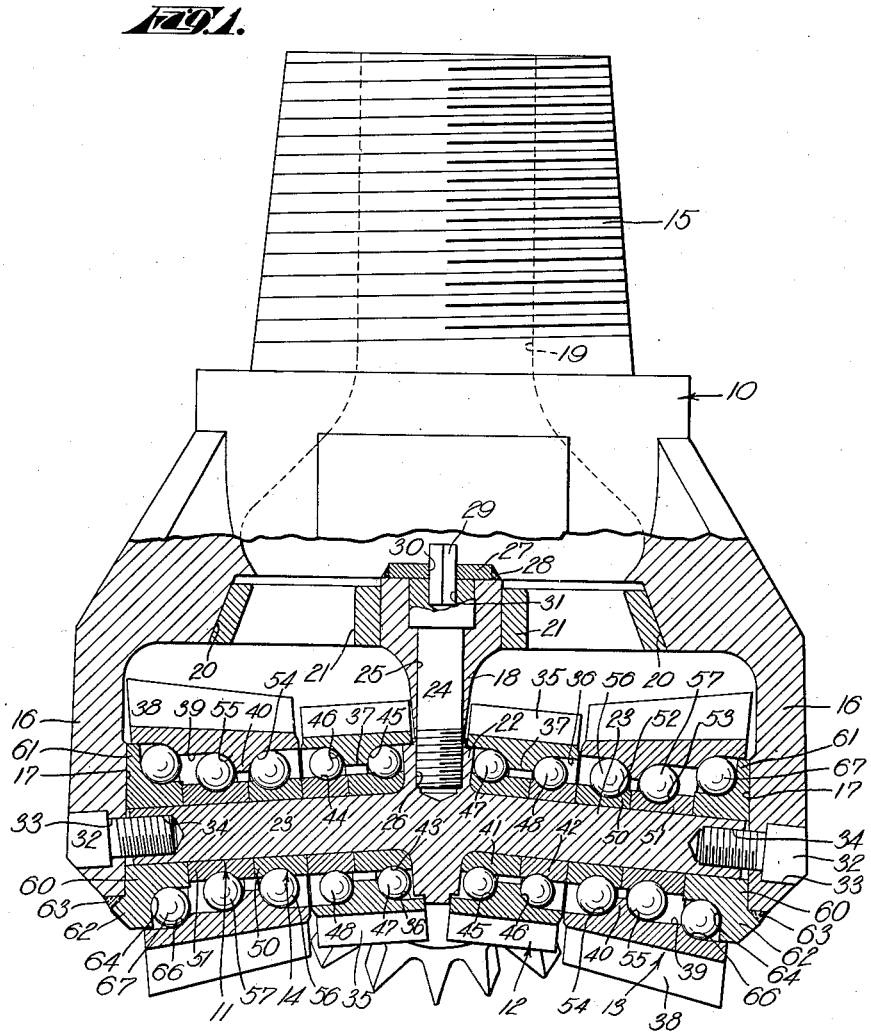
Figure 2:
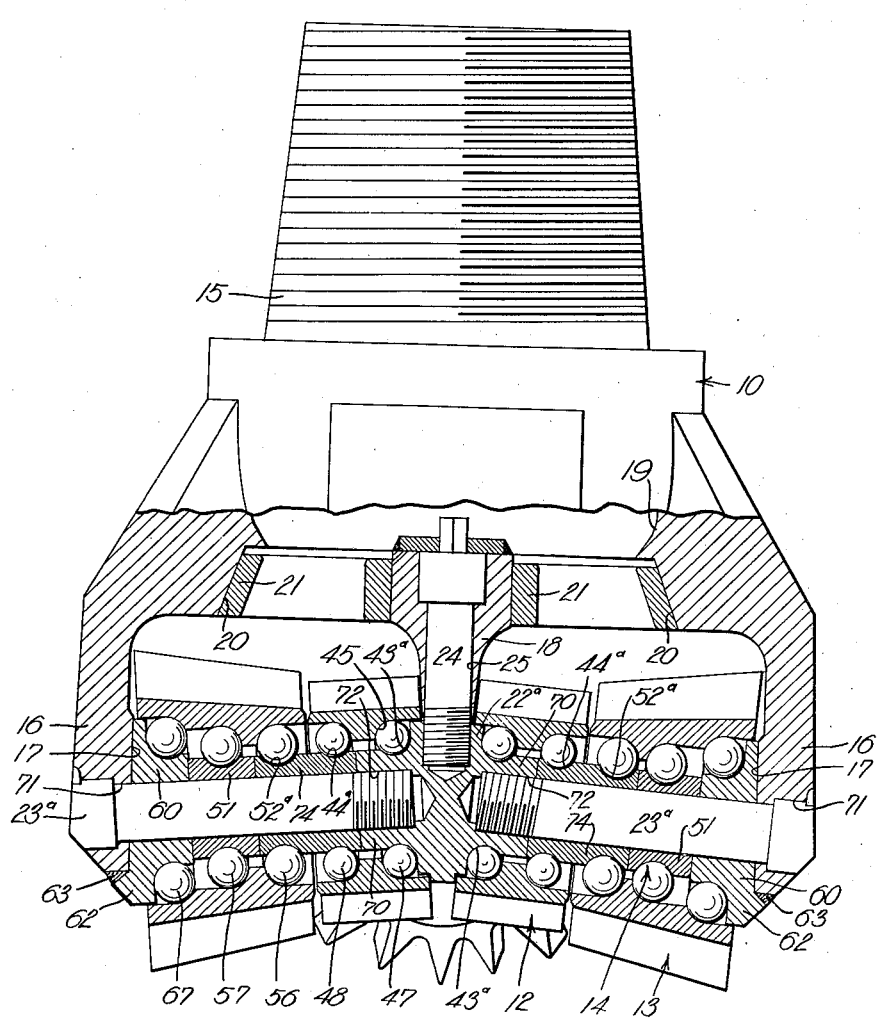

The various objects and features of my invention will be fully understood from the following detailed description of typical preferred forms and applications of the invention, throughout which description reference is made to the accompanying drawings, in which:

Fig. 1 is a side elevation of a well bit embodying one form of the invention with the lower portion in vertical cross section to illustrate the cutter mountings. Fig. 2 is a view similar to Fig. 1 illustrating another form of cutter mounting of the invention.

In the following detailed disclosure I will describe the invention embodied in bearings for rotatably supporting the inner cutters of a rotary rock bit. Two such forms or applications of the invention will be described in detail. It is to be understood that the invention is not to be construed as limited or restricted to the specific forms and applications about to be described.

The bit construction of the present invention illustrated in Fig. 1 includes a bit body 10, a supporting member 11 secured to the body 10, two sets or pairs of roller cutters 12 and 13 and bearing means 14 rotatably mounting the pairs of cutters 12 and 13 on the supporting member 11.

The bit body 10 is intended to be connected with the lower end of a rotary well drilling string. The body 10 may be an integral member or structure designed to carry the above mentioned cutters 12 and 13 for acting on the inner portion of the well bore as well as outer cutters for cutting the bore to gauge. The outer cutters (not shown) and their mountings form no part of the present invention and, therefore, have been omitted from this disclosure.

Means is provided on the upper end of the body 10 to facilitate its connection with the drilling string. In the particular structure illustrated, this means comprises a tapered screw threaded pin 15. Two diametrically opposing legs 16 project downwardly and outwardly from the lower end of the body 10. The lower portions of the legs 16 are substantially vertical and have substantially vertical inner faces 17. The lower outer corners of the legs 16 may be bevelled off. The body 10 further includes a downwardly projecting web 18. The web 18 projects downwardly from the lower end of the body 10 and is substantially equi-distant from the legs. The central web 18 has a flat horizontal lower end and downwardly convergent sides. The lower end of the web 18 is spaced some distance above the plane of the lower ends of the legs 16. The legs 16 and web 18 form three spaced parts for carrying the supporting member 11, as will be hereinafter described. A vertical fluid passage 19 enters the body 10 from the upper end of its pin 15. Spaced discharge ports 20 are provided in the lower wall of the body 10 to communicate with the lower end of the passage 19. The ports 20 are preferably lined with nozzles or beans 21. The beans 21 are directed downwardly to discharge the circulation fluid against the pairs of cutters 12 and 13.

The supporting member 11 is in the nature of an axle or pin for carrying the bearing means 14 and the pairs of cutters 12 and 13. In the form of the invention illustrated in Fig. 1 the supporting member 11 is integral and comprises a central part 22 and arms 23 projecting outwardly from opposite sides of the central part. The central part 22 of the member 11 has a flat upper end for bearing upwardly against the lower end of the web 18. The opposite sides of the part 22 are preferably downwardly convergent as illustrated. The arms 23 of the member 11 integrally join its central part 22 and project outwardly toward the legs 16. The arms 23 are cylindrical and may be of uniform diameter. In the bit structure illustrated the arms 23 slope or incline downwardly and outwardly. The outer ends of the arms 23 are adjacent the legs 16 but need not bear on the legs.

The means for securing the supporting member 11 to the body 10 includes a screw 24 passed downwardly through a vertical opening 25 in the web 18 and threaded into an opening 26 in the central part 24 of the supporting member. The head of the screw 24 is received in the opening 25 and means is provided for preventing loosening or unthreading of the screw. A washer 27 is welded to the lower wall of the passage 19 at 28 to extend across the upper end of the opening 25. A polygonal pin 29 fits correspondingly shaped openings 30 and 31 in the washer 27 and the head of the screw 24 respectively. The polygonal pin 29 serves to prevent unthreading of the screw 24. The washer 27 and the pin 29 are accessible for removal through the passage 19. The outer ends of the arms 23 are secured to the body legs 16. Cap screws 32 are passed inwardly through openings 33 in the legs 16 and are threaded in openings 34 in the outer ends of the arms 23. The heads of the screws 32 are received in the openings 33 to be flush with the outer surfaces of the legs 16. It will be noted that the supporting member 11 is dependably secured to the body 10 at its central part 22 and at the outer ends of its arms 23.

The cutters 12 and 13 are provided in sets, each set comprising a cutter 12 and a cutter 13. Each of these sets of cutters 12 and 13 is rotatably supported on an arm 23 of the member 11 by a bearing means 14. The cutters 12 and 13 are in the nature of roller cutters for acting on the bottom wall of the well bore.

The cutters 12 are cylindrical and are provided at their peripheries with suitable cutting teeth 35. The opposite ends of the cutters 12 may be flat and plain. The outer ends of the teeth 35 may be slightly inset from the outer ends of the cutters 12. The cutters 12 have central longitudinal openings 36. In accordance with the invention an annular ridge or flange 37 is provided on the wall of each cutter opening 36 substantially medially between the ends of the cutter.

The cutters 13 are somewhat larger than the cutters 12 both in length and diameter. The cutters 13 are positioned at the outer ends of the cutters 12 and are frusto-conical cutters arranged with their small ends facing inwardly toward the central axis of the bit. The cutters 13 are provided with suitable peripheral cutting teeth 38. The opposing ends of the cutters 13 may be flat and the teeth 38 may be inset from the inner ends of the cutters. The cutters 13 are tubular, having central longitudinal openings 39. In accordance with the invention an annular rib or flange 40 is provided on the wall of each cutter opening 39. The flanges 40 are spaced a short distance from the inner ends of the cutters 13.

The bearing means 14 are important elements of the invention. The bearing means 14 for rotatably supporting the two pairs of cuters 12 and 13 are preferably identical. Each bearing means 14 includes two bushings 41 and 42 arranged in end to end relation on an arm 23 to extend through a cutter 12. The bushings 41 and 42 may be plain cylindrical parts of the same diameter. The inner ends of the bushings 41 bear against the central part 22 of the member 11. The bushings 41 each have an annular concaved groove or ball race 43. The races 43 are adjacent the inner ends of the bushings 41. Each bushing 42 has an annular ball race 44 in its periphery. The races 43 and 44 may be similar or identical and are cut or turned in the peripheries of the bushings 41 and 42. The bearing means 14 further include spherically concaved ball races 45 on the inner sides of the above described flanges 37. The races 45 occur in the corners between the inner sides of the flanges 37 and the walls of the openings 36 and may merge with the walls of the openings, as illustrated. Similar spherically concaved ball races 46 are provided on the outer sides of the flanges 37. The centers of the races 45 are offset outwardly from the centers of the races 43 relative to the vertical axis of the bit. The centers of the races 46 are offset inwardly from the centers of the races 44 relative to the vertical axis of the tool.

In accordance with the invention series of balls 47 cooperate with the opposing races 43 and 45 and similar series of balls 48 cooperate with the opposing races 44 and 46. The series of balls 47 and 48, of course, support the cutters 12 for free rotation on the bushings 41 and 42. The longitudinal offset or staggered relationship of the races 43 and 45 is such that the balls 47 assume and transmit the inward end thrusts on the cutters 12 as well as the radial thrusts on the cutters. The above described offset relationship between the races 44 and 46 is such that the series of balls 48 take the outward end thrusts as well as the radial thrusts to which the cutters 12 may be subjected. Thus the spaced series of balls 47 and 48 assume the end thrusts in both directions as well as the radial thrusts on the cutters 12, eliminating the necessity for end thrust washers or the like and assuring free rotation of the cutters 12 with a minimum of friction. It is to be noted that the races 43 and 44 present substantial or large surfaces for cooperating with the balls 47 and 48 and, therefore, are long wearing to assure the proper positioning of the cutters 12 for a long period of operation. The bushings 41 and 42 as well as the cutters 12 may be case hardened or otherwise treated so that their respective ball races are long wearing. In the preferred construction illustrated the central part 22 of the member 11 is shaped to fit within the inner ends of the cutter openings 36 to close the inner ends of the cutter 12.

The mounting means or bearing means 14 further include pairs of bushings 50 and 51 arranged on the arms 23 to be within the cutters 13. The bushings 50 and 51 are arranged in end to end relation and the inner ends of the bushings 50 bear against the bushings 42. The bushings 50 and 51 are cylindrical and may be of the same diameter as the above described bushings 41 and 42. Annular ball races 52 and 53 are provided or cut in the bushings 50 and 51 respectively. The bearing means 14 include spherically concaved ball races 54 on the inner sides of the flanges 40 and spherically concaved ball races 55 on the outer sides of the flanges 40. The races 54 surround or oppose the races 52 but have their centers spaced outwardly from the centers of the races 52 relative to the vertical axis of the bit. In a like manner the races 55 oppose the races 53 but have their centers offset inwardly from the centers of the races 53 relative to the vertical axis of the bit. Annular series of balls 56 cooperate with the opposing races 52 and 54 and annular series of balls 57 cooperate with the races 53 and 55. The series of balls 56 and 57, of course, assist in rotatably supporting the cutters 13 and assume the radial thrusts on the cutters. The series of balls 56 cooperate with the races 52 and 53 to transmit the inward thrusts from the cutters 13 to the races 50, this function resulting from the above described relationship of the races 52 and 54. The races 53 and 55 are related so that the balls 57 transmit outward end thrusts from the cutters 13 to the bushings 51. The series of balls 57 are assisted in the transmission of the outward end thrusts by the structure to be hereinafter described. It will be observed that the races 52 and 53 present large or extensive surfaces for engagement by the balls 56 and 57, whereby the bushings 50 and 51 are long wearing.

The bearing means 14 further include bushings or washers 60 on the outer portions of the arms 23. Annular radial flanges 61 are provided on the outer ends of the washers 60. The outer ends of the washers 60 and their flanges 61 bear against the inner faces 17 of the legs 16. Lugs 62 are provided on the lower parts of the flanges 61 and welds 63 secure the lugs 62 to the lower ends of the legs 16. The washers 60 rigidly secured to the legs 16 in this manner directly transmit thrusts to the body legs and are held against rotation and are definitely prevented from chattering when the bit is in operation. The welds 63 may be easily broken or cut away when it is desired to remove the cutters etc. for replacement.

Each washer 60 is provided with an annular cylindrically concaved ball race 64. The races 64 occur in the corners between the inner sides of the flanges 61 and the cylindrical bodies of the washers 60. The washers 60 extend into the cutters 13 to have their inner ends bear against the bushings 51. Thus the bushings 41, 42, 50 and 51 and the washers 60 constitute assemblies whose members are held in end to end relation due to the engagement of the bushings 41 with the part 22 and the engagement of the washers 60 against the legs 16. Shoulders in the form of annular ball races 66 are provided on the walls of the cutter openings 39 adjacent the outer ends of the cutters 13. The races 66 face toward the axes of the cutters 13 and outwardly toward the outer ends of the cutters. The races 66 are positioned to oppose the above described races 64 so that center lines drawn through the centers of the opposing races are at approximately 45° to the longitudinal axis of the arms 23. Annular series of balls 67 are provided to cooperate with the opposing races 64 and 66 to rotatably support the outer ends of the cutters 13. The balls 67, of course, assist in transmitting or assuming thrusts imposed on the cutters 13. In addition to this the balls 67 transmit outward end thrusts from the cutters 13 to the washers 60. Thus the outer cutters 13 are supported against outward end thrusts by the series of balls 57 and 67. It will be observed that the races 64 as well as the races 66 present relatively large surfaces for engagement by the balls 67 and, therefore, are long wearing. A portion of the flanges 61 are received in the openings 39 to close the end of the openings 39 in the cutters 13.

In operation the bit is connected with the lower end of a rotary well drilling string and is operated in the well bore in the usual manner. The cutters 12 and 13 act on formation at the bottom of the well bore to cut away the same and during this operation they rotate about their individual axes. The bearing means 14 described in detail above supports the cutters 12 and 13 for free rotation with a minimum of friction. The several series of balls 47, 48, 56, 57 and 67 directly cooperate with the races on the interiors of the cutters and directly bear in the grooves or races in the bushings and washers on the arms 23. It is to be noted that the races 43, 44, 52, 53 and 64 present large or extensive surfaces for engagement by the series of cutter supporting balls. These extensive surfaces or walls of the races are long wearing due to the fact that the forces transmitted by the balls are well distributed over them as distinguished from structures wherein the balls have point or line contact with the bushings or supporting parts. Owing to the fact that the thrusts or pressures imposed by the balls are distributed over the extensive walls of the above mentioned races the hardened surfaces of the bushings and washers constituting the walls of the races do not wear through. Accordingly the bushings 41, 42, 50 and 51 and the washers 60 are long wearing. The cutters 12 and 13 are rotatably supported by the means 14 so that the bit may be operated during a long run without the necessity of replacing the bearing parts.

As described above, the opposing races on the interiors of the cutters 12 and 13 and in the peripheries of the bushings and washers are related so that the balls assume or transmit the end thrusts in both directions as well as the radial thrusts. Because of the above described relationships between the opposing races it is unnecessary to provide thrust washers or other thrust receiving elements at the end of the cutters. The cutters are entirely supported by the series of ball bearings and do not bear against parts of the body 10 or other parts of the tool to wear the same away. In the structure illustrated in Fig. 1 the single integral member 11 serves to support all of the cutters 12 and 13 and their bearing means 14. Upon the removal of the screws 24 and 32 and cutting the welds 63 the member 11 may be easily detached from the body 10, whereupon the cutters 12 and 13 and their bearings may be easily slid from the arms 12 and 13 for replacement.

Fig. 2 of the drawings illustrates a slightly modified form of the invention. The structure illustrated in Fig. 2 differs from that described above principally in the construction and nature of the supporting member or element for carrying the cutters 12 and 13 and their bearing means 14. The body 10, the cutters 12 and 13, the bushings 51, the washers 60 and the series of balls 47, 48, 56, 57 and 67 may be identical in both forms of the invention and corresponding reference numerals are employed on these parts in both figures of the drawings.

In Fig. 2 the supporting member or element for carrying the cutters 12 and 13 comprises a center part 22ª and two arms or pins 23ª threadedly connected with the part 22ª. The part 22ª is a block-like member bearing upwardly against the lower end of the web 18 and secured to the web by the screw 24. The opposite sides of the part 22ª are downwardly convergent and are shaped to project slightly into the inner ends of the cutters 12. Cylindrical bosses 70 project from the sides of the part 22ª and project into or through the cutters 12. The bosses 70 take the place of the above described bushing 41, as will be subsequently described.

The pins 23ª are in the nature of cap screws passed inwardly through openings 71 in the legs 16 to extend through the cutters 12 and 13 and their bearings and to have their inner portions threaded in openings 72 in the bosses 70. The heads of pins 23ª are received in the openings 71 so that their outer ends are flush with the surfaces of the legs 16. The pins 23ª serve the same function as the arms 23; that is, they carry the bushings and washers of the cutter supporting bearings. The washers 60 are provided on the pins 23ª to engage against the inner faces 17 of the legs 16 and have their lugs 62 welded to the legs 16 at 63. The bushings 51 are provided on the pins 23ª to engage against the inner ends of the washers 60. In the structure illustrated in Fig. 2 each pin 23ᵈ carries an integral bushing 74 which has its outer end bearing against a bushing 51 and which has its inner end bearing against a boss 70. The bushing 74 serves the same function as the above described bushings 42 and 50. Each bushing 74 has two spaced races 44ª and 52ª which are engaged by the series of balls 48 and 56 respectively. Thus the bushings 74 receive the thrusts from the balls 48 and 56 which rotatably support the adjacent ends of the cutters 12 and 13. Annular races 43ª are provided in the corners between the bosses 70 and the sides of the part 22ª. The races 43ª are located so that they oppose the races 45 in such a manner that the balls 47 transmit the inward end thrusts on the cutters 12 as well as the radial thrusts on the cutters.

The operation of the bit illustrated in Fig. 2 is the same as that of the previously described form of the invention. Upon the removal of the screw 24 and the pins 23ª and the cutting of the welds 63, the cutters 12 and 13, the bearing means and the part 22ª are easily removable from the body. The races 44ª and 52ª in the bushings 74 present large surfaces for engagement by the balls 48 and 56 so that the bushings 74 are long wearing. In a like manner the races 43ª are quite extensive and, therefore, long wearing.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In a well bit, a supporting member, two roller cutters surrounding the member, each cutter having two internal races, one facing inwardly and axially in one direction, the other facing inwardly and axially in the other direction, a bushing on the member extending into the opposing ends of the cutters, said bushing having two race grooves formed in its periphery, each race groove opposing a race of a cutter, bushings on the member at the opposite ends of the first named bushing and each having a race groove formed in its periphery, the last mentioned race grooves opposing the other races of the cutters, and series of balls cooperating with the opposing races and race grooves.

2. In a well bit, a supporting member, a roller cutter surrounding the member, a race on the interior of the cutter facing inwardly and toward one end of the cutter, two spaced races on the interior of the cutter facing inwardly and toward the other end of the cutter, two bushings on the member, one having a ball groove opposing the first mentioned race, the other having a ball groove opposing one of the second mentioned races, a washer on the member having a ball groove opposing the other second mentioned race, and series of balls cooperating with the opposing races and grooves.

3. A well bit including, a body having two legs and a web spaced between the legs, the legs and web being integral with the body, a supporting structure comprising a part detachably secured to the web, and pins passed through openings in the legs and secured to said part, bushings on the pins, roller cutters surrounding the pins, and series of balls rotatably supporting the cutters on the bushings and said part.

4. A well bit including, a body having two legs and a web spaced between the legs, the legs and web being integral with the body, a supporting structure comprising a part detachably secured to the web, and pins passed through openings in the legs and threadedly secured to said part, bushings on the pins, roller cutters surrounding the pins, and series of balls rotatably supporting the cutters on the bushings and said part.

5. A well bit including, a body having two legs and a web spaced between the legs, a supporting structure comprising a part secured to the web, and pins passed through openings in the legs and secured to said part, said part having bosses at the inner ends of the pins, there being a ball groove in each of the bosses, a bushing on each pin engaging against a boss, ball grooves in the bushings, roller cutters surrounding the bushings and bosses, and series of balls cooperating with said grooves and rotatably supporting the cutters.

6. A well bit including, a body having two legs and a web spaced between the legs, a supporting structure comprising a part secured to the web, and pins passed through openings in the legs and secured to said part, bosses on the said part at the inner ends of the pins, the bosses having ball grooves, a bushing on each pin having a ball groove, roller cutters surrounding the bosses and the adjacent bushings, the cutters each having a ball race facing inwardly and toward one end of the cutter to oppose the groove of a boss, and a ball race facing inwardly and toward its other end to oppose the groove of a bushing, and series of balls cooperating with the grooves and races to rotatably support the cutters.

ALFRED C. CATLAND.